Figure 1:
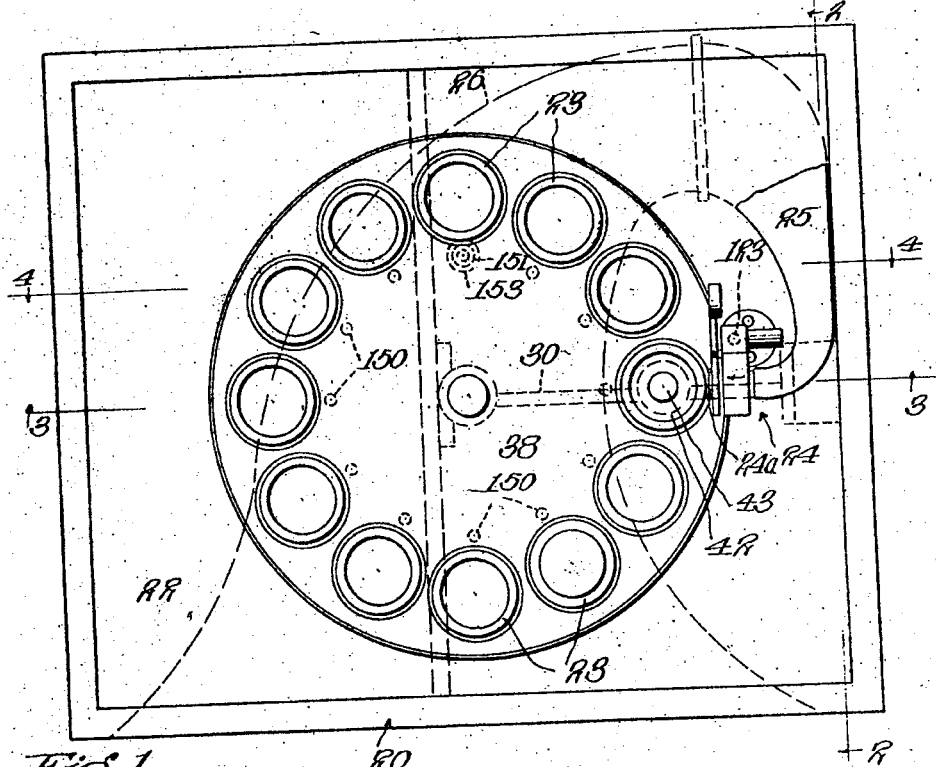

H. T. SCOTT & L. J. PATTERSON.
AUTOMATIC PHONOGRAPH.
APPLICATION FILED MAY 27, 1911.

1,040,029.

Patented Oct. 1, 1912.
6 SHEETS—SHEET 1.

Witnesses
Elwood H. Bartelow
B. McCordie

Inventors
Harry T. Scott and
Leo J. Patterson
by James T. Bartelow
their Attorney

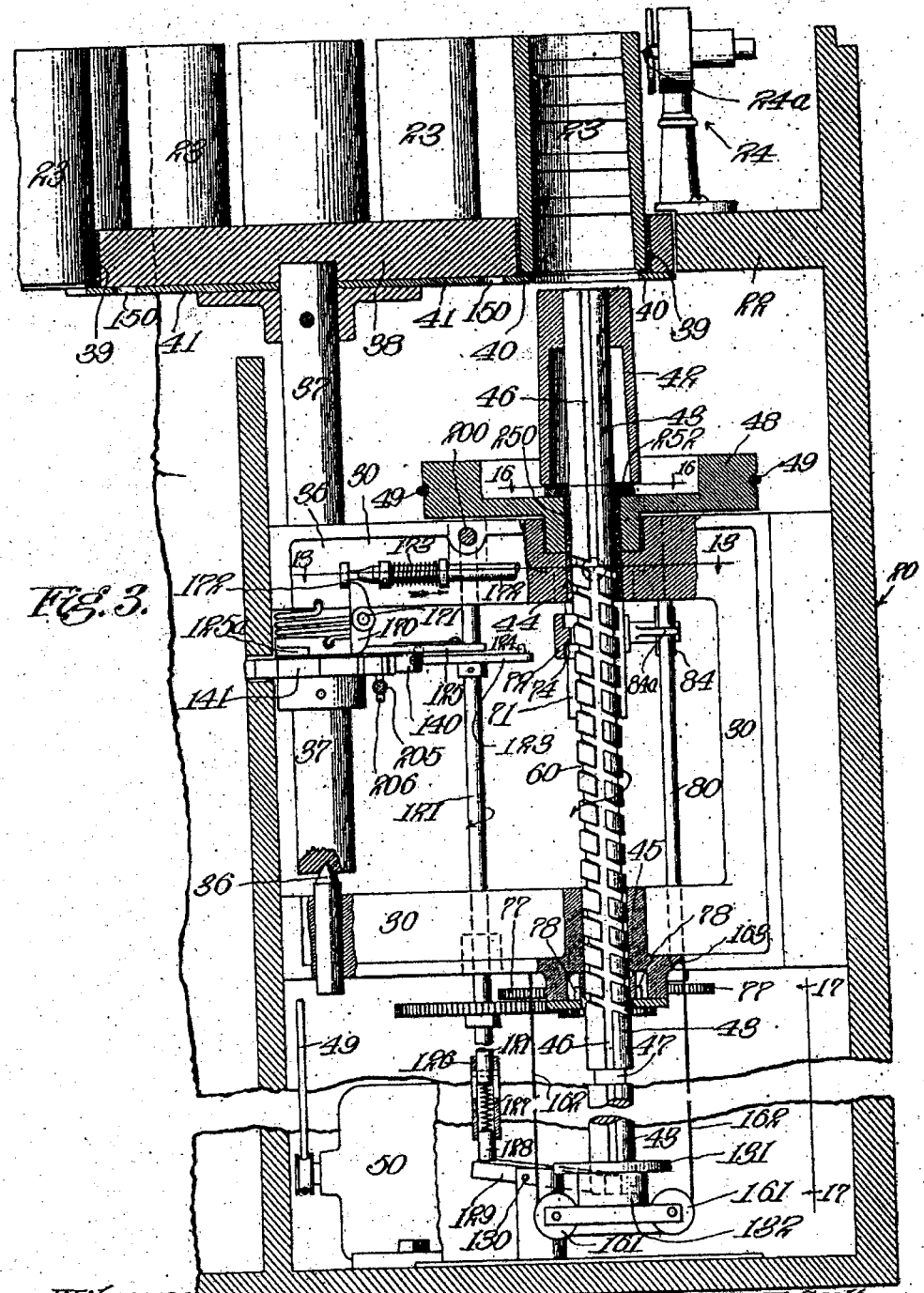

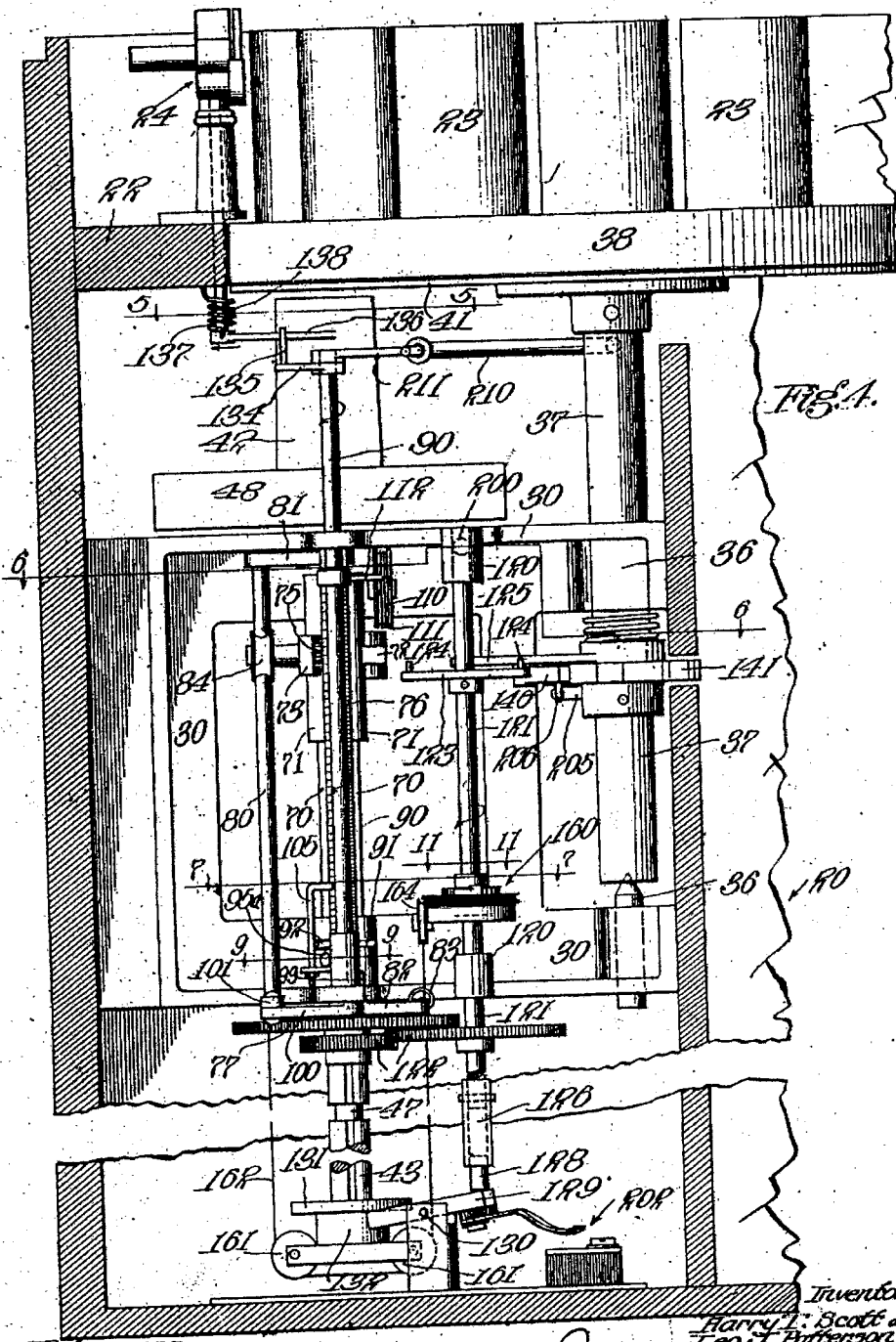

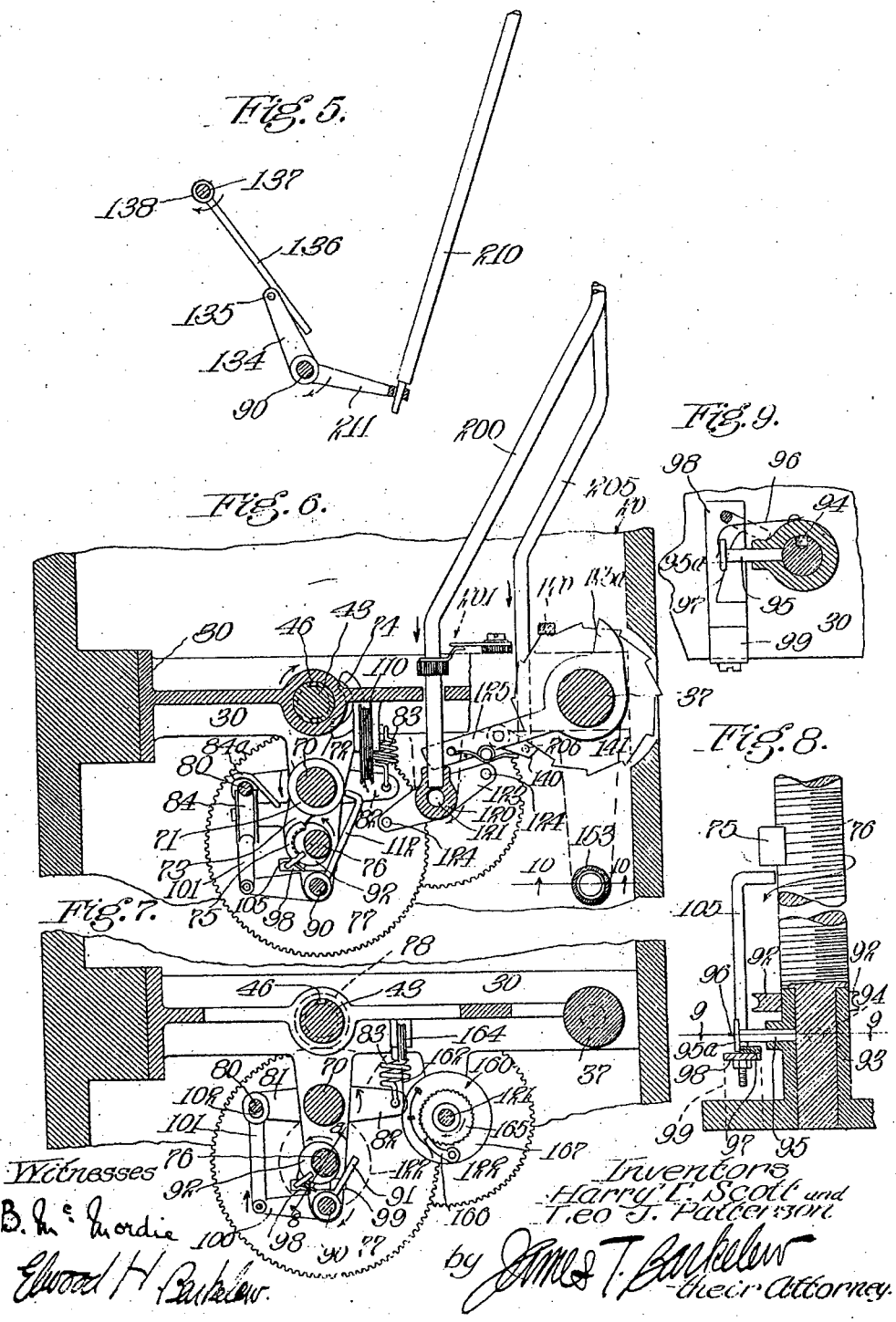

H. T. SCOTT & L. J. PATTERSON.
AUTOMATIC PHONOGRAPH.
APPLICATION FILED MAY 27, 1911.
1,040,029.
Patented Oct. 1, 1912.
6 SHEETS—SHEET 5.
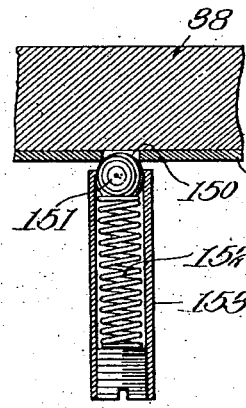
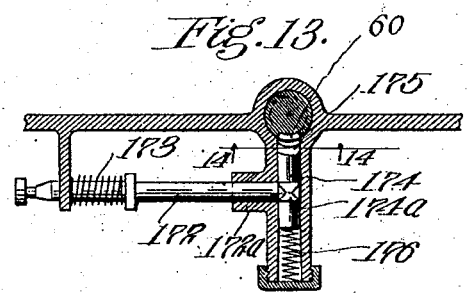
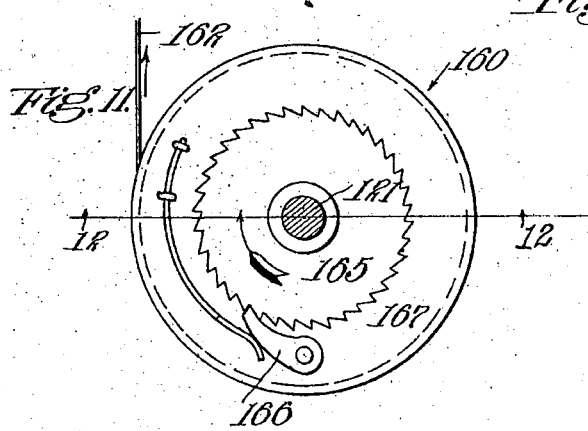
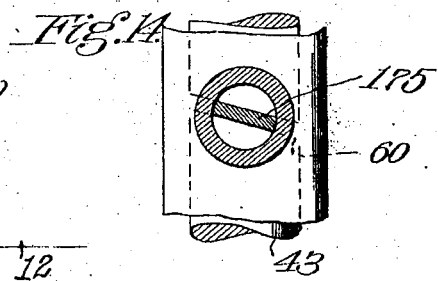
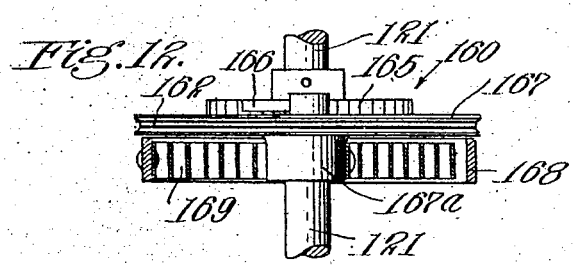
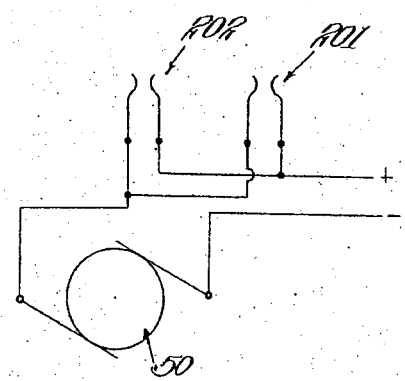
Witnesses
B. McMordie
Edward H. Butler
Inventors
Harry T. Scott and
Leo J. Patterson
by James T. Bakelew
their Attorney.

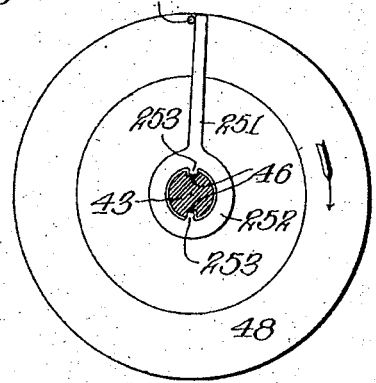
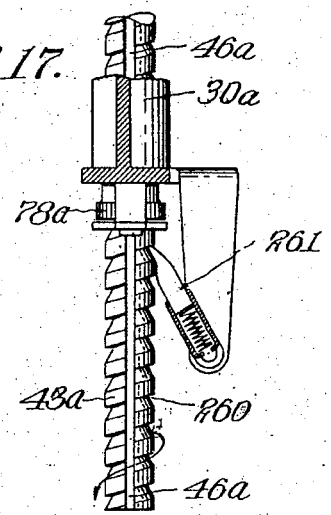

UNITED STATES PATENT OFFICE.

HARRY T. SCOTT AND LEO J. PATTERSON, OF LOS ANGELES, CALIFORNIA; SAID PATTERSON ASSIGNOR TO SAID SCOTT.

AUTOMATIC PHONOGRAPH.

1,040,029.  Specification of Letters Patent.  Patented Oct. 1, 1912.

Application filed May 27, 1911. Serial No. 629,892.

*To all whom it may concern:*

Be it known that we, HARRY T. SCOTT and LEO J. PATTERSON, citizens of the United States, both residing at Los Angeles, in the county of Los Angeles and State of California, have invented new and useful Improvements in Automatic Phonographs, of which the following is a specification.

This invention relates to an automatic phonograph for playing automatically and successively a number of phonograph records of the ordinary cylindrical, or Edison, type; and the invention consists primarily in an arrangement of mechanisms whereby the records are carried with their axes in vertical positions and are elevated from the carrying member or table to a position adjacent the reproducing mechanism, which reproducing mechanism is located above the table at a convenient position to engage the records when they are raised.

In its specific preferred embodiment our invention consists of a rotating table mounted on a vertical axis, the table having pockets arranged around its periphery and in which the cylindrical records are adapted to rest. The pockets extend through the table, the records resting on annular shelves around the lower edges of the pockets, so that there is an opening under each pocket through which the record raising member and record engaging mandrel may pass. The table is provided with an intermittent rotating mechanism so that it may be moved to place successive records over the record engaging mandrel. The mandrel is mounted on the upper end of a vertically movable and rotatable shaft, the action of the shaft being first to move vertically and engage the mandrel with the record immediately above, move the record to a point adjacent the reproducing mechanism, and then to rotate and slowly move downwardly in a manner designed to keep the sound groove of the record in engagement with the reproducing needle. In other words, the record is both rotated and moved longitudinally—given two distinct movements—instead of, as heretofore, rotating the record and moving the reproducing mechanism longitudinally along the record. In our machine the reproducing mechanism is held stationary, at least so far as movement along the record is concerned. When the record carrying mandrel has moved downwardly to a point where the reproduction of the record is completed, the mechanism allows the mandrel to move quickly to its lowermost position. In doing this, the record is left in its pocket on the table. Immediately the mandrel has reached its lowermost position and is free of the table, the table is rotated through a certain portion of a revolution to bring the next record directly over the mandrel. When this has been accomplished the mandrel is again automatically started upward and the whole operation repeated.

Figure 2:
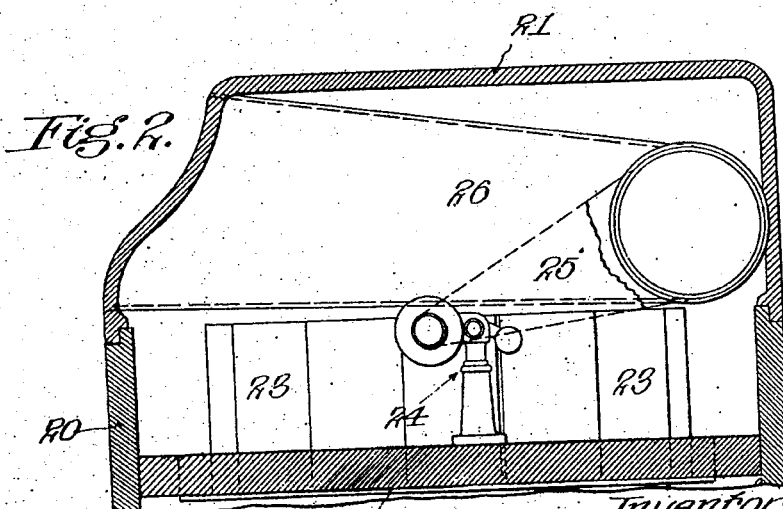

We will show in the accompanying drawings our present preferred form of apparatus; but it will be understood that there are certain variations which we may make, and we have shown some of these variations, notably a modified form of controlling the downward movement of the mandrel. These features will be best understood from the following specification taken in connection with the accompanying drawings, in which:

Figure 1 is a plan view of our mechanism as arranged within a case, the cover being removed. Fig. 2 is a section of the same taken as from line 2—2 on Fig. 1 with the cover in place. Fig. 3 is an enlarged vertical section and elevation taken on line 3—3 of Fig. 1. Fig. 4 is an enlarged vertical section and elevation taken on line 4—4 of Fig. 1. Fig. 5 is a horizontal section taken on line 5—5 of Fig. 4. Fig. 6 is a horizontal section taken on line 6—6 of Fig. 4. Fig. 7 is a horizontal section taken on line 7—7 of Fig. 4. Fig. 8 is an enlarged detail section taken on line 8—8 of Fig. 7. Fig. 9 is a cross section taken on line 9—9 of Figs. 4 and 8. Fig. 10 is a cross section taken on line 10—10 of Fig. 6. Fig. 11 is an enlarged section taken on line 11—11 of Fig. 4. Fig. 12 is a section taken on line 12—12 of Fig. 11. Fig. 13 is an enlarged section taken on line 13—13 of Fig. 3. Fig. 14 is a further enlarged section taken on line 14—14 of Fig. 13. Fig. 15 is a diagram showing the electrical control of the motor. Fig. 16 is a section taken on line 16—16 of Fig. 3 and showing the means of driving the mandrel shaft from the fly-wheel. Fig. 17 is a view taken as indicated by line 17—17 on Fig. 3, but illustrating a modified form of mechanism for lowering the mandrel shaft.

In the accompanying drawings we have shown our mechanism housed within a case 20 provided with a cover 21. Case 20 is provided with a horizontal shelf 22 at a distance below its upper edge measured more or less approximately by the length of records 23, and reproducing mechanism 24 is secured on and above this shelf. We have shown a special form of horn which leads with a tapering arm 25 from the reproducing mechanism back and upwardly toward the rear edge of cover 21, the horn 26 curving laterally and forwardly and opening at the front of the cover. The horn lies wholly above the tops of records 23 so that the movement of the records is not interfered with in any particular. This arrangement of the horn in the cover of the case is most convenient with our present arrangement on account of the arrangement of all the operating mechanism below shelf 22.

Below shelf 22 the case is divided into two main compartments and in one of the compartments the operating mechanism is located. A suitable frame 30 is secured to the case in any desired manner, it being preferable to secure it so that any vibrations generated in the moving mechanisms will not be transmitted to the case. Near one end the frame is provided with bearings 36 which carry table shaft 37. On the upper end on table shaft 37 is mounted a circular flat table 38 provided with a series of pockets 39 arranged around its circumference. Pockets 39 extend vertically through the table and records 23 rest at their lower edges on an annular shelf 40 which is formed by a plate 41 secured to the under side of the table. The apertures in plate 41 are of sufficient diameter to pass mandrel 42, which mandrel is made to engageably fit within the records. Mandrel 42 is mounted on the upper end of mandrel shaft 43 which extends down through bearings 44 and 45 in frame 30. Mandrel shaft 43 is of considerable length and projects below frame 30 for some distance. It is provided with longitudinal key-ways 46 reaching from near its upper end to an annular groove 47 cut at a point somewhat below its center. In the upper part of frame 30 a fly-wheel 48 is provided with a bearing and this fly-wheel is keyed to the shaft so as to revolve therewith but to allow vertical movement of the shaft without moving the fly-wheel vertically. Our special means for effecting this connection of the fly-wheel to the shaft will be considered later. This fly-wheel is also the driving wheel of the apparatus, the driving being done through the medium of a belt or other member 49 which connects with a motor 50 placed in the bottom of the case. The control of motor 50 will be hereinafter explained. Below fly-wheel 48 and leading down to a point near groove 47 a helical groove or screw thread 60 is cut in mandrel shaft 43, this groove being preferably of the same depth as key-ways 46. Mandrel shaft 43 revolves in the direction indicated, right handed looking down on the top, and helical groove 60 is cut so that, when engaged by a stationary member, it will cause the shaft to rise by virtue of its own rotation. The means for engaging the groove will be explained hereinafter, together with its connection and actuation with other parts of the mechanism.

Located in bearings in frame 30 alongside and parallel to mandrel shaft 43 is a vertical guide column 70 on which a sleeve 71 is adapted to move. Sleeve 71 carries two horizontally projecting arms 72 and 73, arm 72 carrying a segmental lug 74 adapted to engage in annular groove 47 of mandrel shaft 43, and arm 73 carrying a half nut 75 screw threaded to engage with the screw threads on feed shaft 76. Feed shaft 76 stands vertically in frame 30 and is rotated in the direction indicated by means of gear connections 77 and 78 with mandrel shaft 43. Sleeve 71 is rotatively connected to column 70 but is slidable thereon through the medium of a novel arrangement which we have evolved for this particular situation. We have found that the use of a key and slot creates so much friction that considerable force is necessary to draw sleeve 71 to the position shown in the drawings after it has been fed down to its lowermost position. We have therefore adopted a mechanism comprising a vertical rod 80 which is supported between two horizontal arms 81 rigidly connected with column 70 at its top and bottom. Lower arm 81 is provided with an extension 82, and a spring 83 connected between the end of extension 82 and frame 30 tends to pull column 70 and rod 80 around in the direction indicated. Sleeve 71 carries a small wheel 84 which rotates on rod 80 so that the sleeve is rotated to throw lug 74 and nut 75 into engagement with mandrel shaft 43 and feed shaft 76. The operation of the parts is effected by a trip mechanism shown in Figs. 6 and 7 and partly in detail in Figs. 8 and 9. A trip shaft 90 is vertically mounted in the frame and carries on its lower end a radially projecting rod 91 which is, in effect, a cam follower for cam 92. Cam 92 is mounted on a sleeve 93 loosely surrounding the lower end of feed shaft 76 and normally does not revolve therewith. The feed shaft is provided with an aperture 94 and a small spring pressed pin 95 is adapted to enter the aperture when it is released to be pressed inwardly by its spring 96. But it is normally held outwardly by riding over an eccentric shoulder 97 on a small spring supported member 98. Member 98 is supported by a spring 99 from frame 30 in such a manner that it may be pressed downwardly and shoulder 97 pressed out of engagement with head 95* of pin 95. Immediately member 98 is pressed downwardly pin 95 is free to be pressed into aperture 94 when the aperture comes beneath the end of the pin in the course of the rotation of feed shaft 76. Cam 92 is then rotated with the feed shaft and follower 91 is pushed away in the direction indicated. This rotates trip shaft 90 in the direction indicated and causes the movement of an arm 100 mounted on the lower end of the trip shaft. Arm 100 is connected by a rod 101 with rod 80, but a slot 102 is made in rod 101 around rod 80 so as to allow a certain amount of movement of shaft 90 before rod 80 is moved. The downward movement of member 98 is caused by nut 75 coming into contact with adjustable member 105 when the nut reaches the lowermost portion of its downward movement. It thus sets in action the mechanism just described and shaft 90 is first rotated in the direction indicated to throw the reproducer point away from the record whose reproduction has just been finished (this action will be explained later) and then arm 81 and guide column 70 are moved in the direction opposite to that indicated. This movement of the guide column and of rod 80 allows sleeve 71 to rotate so as to disengage nut 75 from feed shaft 76 and at the same time to disengage segmental lug 74 from groove 47 in mandrel shaft 43. When this is done the sleeve 71 with its connected parts is immediately pulled upwardly to the position shown in Fig 4 by the action of a small spring operated reel 110. This spring operated reel is of ordinary construction and it is thought unnecessary to show its details, it merely imposing a tension on a wire or other flexible connecting member 111 which is secured to the sleeve 71 or to one of its attached parts, the upward pull being sufficient to raise the sleeve to the position illustrated. When the sleeve reaches its upward position it passes under the end of a finger 112, shown in Figs. 4 and 6, and holds trip shaft 90 in the position shown in Figs. 6 and 7. In this position of the trip shaft the reproducer point is held away from the records; the reproducer point is consequently not let into engagement with the record until sleeve 70 has again begun its slow downward screw fed motion to the extent of passing away from the end of finger 112.

Trip shaft 90 projects above frame 30 and carries on its upper end a small arm 134 having an upwardly projecting pin 135. Pin 135 is engaged by an arm 136 projecting radially from the lower end of reproducer shaft 137. The reproducer shaft has a constant tendency to rotate in the direction indicated under the influence of a spring 138, and this tendency unimpeded will throw the reproducer point into engagement with a record carried by the mandrel. Spring 138 also tends to rotate shaft 90 in the direction opposite to that indicated and to consequently throw follower 91 up against cam 92; but it is prevented from throwing the follower to its ultimate position by finger 112 bearing against sleeve 71, as shown in Fig. 6. In this position the reproducer point is away from the record, and the point remains in this position at all times except when the record is being reproduced and is being rotated and fed slowly downwardly by the action of feed screw 76.

We will now explain the mechanism by which the mandrel shaft is lowered and by which the record carrying table is intermittently rotated. Mounted in bearings 120 on frame 30 is a counter shaft 121 which has gear connections 122 with feed shaft 76. The ratio of reduction between feed shaft 76 and counter shaft 121 may be anything desired; we have shown it about one to two. Shaft 121 is rotated in the direction indicated and carries near its upper end a double arm 123 having pins 124 which are adapted to engage with ratchet arm 125 when shaft 121 is raised to the position shown in Fig. 4. The normal position of shaft 121 is a position lowered from that illustrated in Fig. 4 to such an extent that pin 124 will revolve beneath arm 125 without engaging with it. Shaft 121 projects below lower bearing 120 and its end is slidably but rotatively engaged in a sleeve 126. Sleeve 126 contains a spring 127 which presses upwardly on shaft 121, and a stud 128 rigidly secured in the lower end of the sleeve is adapted to be lifted by engagement with the end of a lever 129 pivoted at 130 and having its other end adapted to be pressed downwardly by a collar 131 which forms a portion of a step bearing 132 under the lower end of mandrel shaft 43. When the mandrel shaft reaches its lowermost position this flange operates lever 129 to move stud 128 and sleeve 126 upwardly, and also, normally, to move shaft 121 upwardly so that one of pins 124 will engage with ratchet arm 125 during their rotation. But, should it happen that this operation takes place when one of pins 124 is beneath arm 125, spring 127 will press and allow shaft 121 to remain down until the pin passes out from beneath arm 125. The other pin will then engage the arm as it rotates.

Ratchet arm 125 is pivoted around table shaft 37 and carries pawl 140 adapted to engage with the teeth of ratchet 141. Ratchet 141 is rigidly set on shaft 37; and the different parts are so arranged and proportioned that the movement imparted to arm 125 by engagement with one of pins 124 is sufficient to rotate the ratchet through an angular distance equal to the angular distance between the records on the table above (in this case one-twelfth of the revolution). Means are provided for holding the table accurately in position at the end of its movement, this means comprising a series of apertures 150 cut in its under surface and adapted to be engaged by a ball 151 pressed upwardly by a spring 152 carried in a tube 153. Tube 153 is supported from the frame in any desired manner and is so placed that the entry of ball 151 into one of apertures 150 will stop the table accurately in position with one of records 23 directly above mandrel 42; yet not so much resistance to rotation is imposed that it is impossible for the ratchet mechanism to easily rotate the table from one position to the next.

A means of controlling the downward movement of mandrel shaft 43 is comprised in a small ratchet device 160 mounted on shaft 121. Step bearing 132 at the lower end of mandrel shaft 43 carries a pair of small pulleys 161 over which a cord or other flexible member 162 passes. Cord 162 is secured at one end, as at 163, to frame 30 and passes upwardly at its other end from pulleys 161 to and over a small pulley 164 and thence to ratchet mechanism 160. The ratchet mechanism, shown in detail in Figs. 11 and 12, comprises a ratchet wheel 165 rigidly attached to shaft 121 and engageable by a small spring pressed pawl 166. Pawl 166 is set on a wheel 167 over which flexible member 162 winds up. Below wheel 167 a stationary frame 168 is placed and one end of a spiral spring 169 is secured to this frame, the other end of the spring being secured to hub 167ª of wheel 167. Wheel 167 is loosely mounted on shaft 127 and does not normally rotate therewith. When the mandrel shaft is lowering and wheel 167 is being rotated in the direction indicated by reason of the movement of flexible member 162, the spring 169 is being wound up; and when the mandrel shaft is raised the spring will then rotate wheel 167 in the opposite direction and take up the slack in flexible member 162. Wheel 167 may rotate in the direction opposite to that indicated as fast as desired; but when it rotates in the direction indicated it will be seen that pawl 166 engaging with ratchet 165 will prevent the wheel from rotating faster than shaft 121 if rotating in the same direction. Thus mandrel shaft 43 can only be lowered as fast as flexible member 162 is let out when wheel 167 is traveling at the same speed of rotation as shaft 121; and this speed is so adjusted that the mandrel shaft is let down quickly but without any shock to the mechanism.

We will now explain the general operation of the mechanism described, leaving the explanation of the manual control of the machine to be set forth later. In the drawings the machine is shown in the position in which it will be stopped (the mechanism for causing its stoppage always in this position will be later explained). Starting with the machine in this position and supposing the rotation of mandrel shaft 43 to commence and supposing the rotation of the other parts to be as described, it will be seen that one of pins 124 will immediately engage with arm 125 and cause the rotation of the record carrying table 38 to its next position. Mounted on arm 125 and projecting on the opposite side of shaft 37 therefrom is a projection 125ª which will engage with a small lever 170 at the end of its movement, or just as table 38 is coming into position. Lever 170 is pivoted at 171 on the frame and its other end engages the end of a sliding rod 172. Rod 172 is pressed in the direction indicated by a spring 173 and is moved against the pressure of the spring by the action of lever 170. Rod 172 is pointed on its end as at 172ª (shown in Fig. 13) and this pointed end is adapted to engage with a similarly shaped groove 174ª in plunger 174. Plunger 174 is provided on one end with a segmental lug 175 which is adapted to engage with screw thread groove 60 in mandrel shaft 43, and is pressed into engagement by a spring 176. When the parts are into position shown in Fig. 13, lug 175 is kept out of engagement with the screw thread groove, but when rod 172 is moved to the left the lug 175 is pressed into engagement with the mandrel thread by spring 176. The rotation of the mandrel shaft then causes it to rise until the end of thread 60 comes to lug 175, and the lug and plunger 174 are pressed outwardly by the rising end of the thread until the end of rod 172 again will engage in groove 174ª, when spring 173 will force rod 172 to the right and thus force plunger 174 out against the action of spring 176. But when this takes place the segmental lug 74 on arm 72 carried by sleeve 71 drops into annular groove 47, the parts being so proportioned that groove 47 reaches a position under lug 74 just as the end of screw thread 60 reaches a position under lug 175. The mandrel shaft is then at its uppermost point and has been raised sufficiently to pass mandrel 42 into a record 23 and to raise the record so that its lower end is opposite reproducer point 24ª. The reproducer point is still held out of engagement with the record for the reason that sleeve 71 is still beneath the end of finger 112. When lug 74 moves into groove 47, nut 73 engages with screw thread feed shaft 76. The threads on feed shaft 76 are so cut that the rotation of the shaft immediately tends to feed the nut 73 and sleeve 71 downwardly. The mandrel shaft, mandrel and record, are thus fed downwardly as fast as sleeve 71 is fed downwardly; and the speed of downward feed is so arranged with relation to the rotation of the mandrel shaft that the record is fed downwardly at the exact speed required to keep the reproducing point in engagement with the sound groove. A small amount of downward movement of sleeve 71 suffices to move the sleeve away from the end of finger 112, and spring 138 then immediately moves reproducer shaft 137 in the direction indicated and moves reproducer 24 in the direction indicated (in Fig. 1) and moves the reproducer point into engagement with the record and the sound groove thereon. The reproduction of the record immediately begins and continues as long as the mandrel is rotated and is fed slowly downwardly by the action of feed screw 76. The different parts of the mechanism are so arranged and proportioned that, when the record has been fed downwardly to a point where its whole sound groove has been traversed by the reproducing needle, then nut 73 engages with member 105 of the trip mechanism and causes the operation of the trip mechanism as hereinbefore set forth. The operation of the trip mechanism causes the rotation on trip shaft 90 in the direction indicated and causes, first, the movement of the reproducer to remove the reproducing point from engagement with the record, and second, causes the movement of rod 80 and allows nut 75 to disengage from feed shaft 76 and allows segmental lug 74 to disengage from groove 47 in mandrel shaft 43. Sleeve 71 being thus released is immediately pulled to its uppermost position where it remains until the next operation of the machine. The mandrel shaft, being now unsupported from the feed shaft, falls as fast as is allowed by ratchet mechanism 160. As it moves downwardly, the record 23, which has been held by mandrel 42, is again left in position on table 38, the mandrel moving on downwardly to the position shown in Fig. 3. When the mandrel and mandrel shaft reach their lowermost positions, counter shaft 121 is moved upwardly, as hereinbefore described, and the movement of table 38 to place the next record over the mandrel takes place. At the same time, or at the end of this movement, the mechanism shown in Fig. 13 is operated and allows lug 175 to engage with the screw thread in mandrel shaft 43, causing the mandrel shaft to rise and the mandrel to engage with the next record. The foregoing described operation is thus repeated; and it will be repeated and the records played successively just so long as the mandrel shaft is rotated—or, in other words, in the present arrangement, as long as current is supplied to motor 50.

For the manual control of the machine we have provided means for starting and stopping the operation, means for repeating a record as many times as desired, and means for discontinuing the reproduction of any record and going on to the successive record. For starting and stopping the machine we have provided a control rod 200 which enters bearing 120 above the upper end of counter shaft 121. Control rod 200 may be moved in the direction indicated so that its end will then project over the upper end of shaft 121 and prevent that shaft from being raised to the position shown in Figs. 3 and 4. This will prevent the feeding of the table when mandrel shaft 43 reaches its lowermost position. A switch 201 is mounted on rod 200 and on frame 30 and is normally closed when rod 200 is in the position shown—its outward position. Switch 201 controls the supply of current to motor 50, as is shown in Fig. 15, so that when rod 200 is out and will allow the raising of shaft 121, current is supplied to the motor and the whole mechanism is operated. When rod 200 is pressed inwardly the switch 201 is opened; and if this switch solely controlled the motor then the machine would stop whenever rod 200 was pressed inwardly. But it is desirable to have the arrangement such that the machine will go on operating until the mandrel reaches its lowermost position, leaving all the records standing on the table and thus obviating any liability of breakage of records or of the machine. We have provided for this by installing a second switch 202 which is mounted, for instance, on lever 129 and on the case in such a manner that ordinarily the switch 202 will be closed, but when lever 129 is moved by the mandrel shaft the switch will be open. This position of the switch is shown in Fig. 4. Switch 202 is arranged in multiple with switch 201, as is shown in Fig. 15; and it will thus be seen that, should switch 201 be opened with the mandrel at any point above its lowermost position, current will be continuously supplied to the motor through switch 202 until the mandrel shall reach its lowermost position and open switch 202. But when the mandrel reaches this position and tends to raise shaft 121, the shaft is prevented from being raised by the previous operation of control rod 200. The whole operation of the machine is thus stopped with the parts in the position shown in Figs. 3 and 4.

For continuing to play any desired record we have provided another control rod 205 which projects into the machine and is adapted to engage a pin 206 mounted on pawl 140. By pressing inwardly on rod 205 (all the control rods being provided with operating buttons or the like on their outer ends outside the case) the pawl 140 is raised so that it will not engage with the teeth of ratchet 141. Ratchet arm 125 may then oscillate without moving the record carrying table, and the next upward movement of the mandrel will pick up the record which has just been replaced on the table. The parts are so arranged that there is sufficient friction to keep rod 205 in either the position shown or in its position pressed inwardly; so that, by pressing the rod inwardly, the same record will be repeated until the rod is pulled out again.

For discontinuing the play of any record we have provided a third control rod 210 which engages with its end an arm 211 mounted on trip shaft 90. Through the medium of this arm 210 trip shaft 90 may be rotated in the direction indicated, and this rotation will effect the same results as the rotation by the trip mechanism hereinbefore explained; namely, to first turn the reproducer to disengage the reproducer point from the record and then to disengage nut 75 and segmental lug 74 from the feed shaft and mandrel shaft, respectively, allowing sleeve 71 to rise to its uppermost position and allowing the mandrel shaft to drop. This immediately replaces the record on the table, and when the mandrel shaft reaches its lowermost position the various mechanisms are actuated to feed the table around and to again lift the mandrel to pick up the next record.

We have found that the ordinary method of connecting fly-wheel 48 to mandrel shaft 43, by means of a key and key-way, is productive of a certain amount of loose movement and knocking. We have consequently evolved a novel form of connection for use in our mechanism which obviates all noise. This is best shown in Figs. 3 and 16. The fly-wheel runs on an internal bearing on a sleeve 250 and has no direct connection with the mandrel shaft. On top of the fly-wheel is placed a radially extending bar 251 having a ring portion 252 loosely surrounding the mandrel shaft. This bar has two lugs or keys 253 which engage loosely with key-ways 46 in the mandrel shaft; and the outer end of the bar engages a pin 254 set in the edge of the fly-wheel and as nearly over the point of belt pull as possible. By so placing the pin 254 the pressure imposed by the fly-wheel on its bearing is minimized (considering the fly-wheel as a lever fulcrumed at pin 254 with the power applied by the belt 49 and the work done by pressure exerted on bearing sleeve 250).

In Fig. 17 we have shown a modified form of mechanism for lowering the mandrel shaft, taking the place of the mechanism shown in Figs. 11 and 12. For this purpose the lower end of the shaft is provided with screw threads 260 of V-shaped section with a square surface on the upper side. A detent 261, spring cushioned, is hung from frame 30* so as to fall into the threads and prevent the shaft from lowering faster than by virtue of its rotary motion in the direction indicated. But when the shaft is rotating and is stationary longitudinally, or is moving upwardly, or is moving downwardly, more slowly than threads 261 would lower the shaft by their action; then the threads will appear to move upwardly under the end of the detent and the detent will merely be raised on the inclined surface of the threads and drop over the square surfaces. When the shaft is released it will drop until the detent catches in the thread portion immediately above, when the shaft will screw itself down to its lowermost position.

Having described our invention, we claim—

1. A device of the character described, comprising a record support, a record carrier rotatable about and movable along a longitudinal axis, means for rotating the carrier, means for causing the longitudinal movement of the carrier by virtue of its own rotation, a movable reproducer mechanism into proximity with which a record is moved by the longitudinal movement of the record carrier, a feed screw arranged parallel to the carrier and rotatively connected therewith, a feed member engageable with the screw threads of the feed screw and with the carrier to be moved longitudinally by the rotation of the feed screw, and a mechanism controlled by the longitudinal position of the feed member and adapted to both disengage the feed member with the feed screw and the carrier and to move the reproducer mechanism relatively to a record carried by the carrier.

2. A device of the character described, comprising a record support, a record carrier rotatable about and movable along a longitudinal vertical axis, means for rotating the carrier, means for causing the longitudinal movement of the carrier by virtue of its own rotation, a reproducer mechanism into proximity with which the record is moved by the longitudinal movement of the carrier, a vertical feed screw arranged parallel to the carrier and rotatively connected therewith, a feed member engageable with the screw threads of the feed screw and with the carrier to be moved downwardly by the rotation of the feed screw, a mechanism controlled by the position of the feed member and adapted to disengage the feed member from the feed screw and the carrier and to move the reproducer mechanism out of engagement with the record on the carrier, and means to move the feed member upwardly when disengaged from the feed screw and the carrier.

3. A device of the character described, comprising a record support, a reproducer mechanism, a record carrier rotatable about and movable along a longitudinal axis, means for rotating the carrier, means for causing the longitudinal movement of the carrier by virtue of its own rotation, the carrier in its longitudinal movement being adapted to engage and carry a record to a point near the reproducer mechanism, a feed screw arranged parallel to the carrier and rotatively connected therewith, a feed member engageable with the screw threads of the feed screw and with the carrier to be moved longitudinally by the rotation of the feed screw, a mechanism controlled by the position of the feed member and adapted to disengage the feed member with the feed screw and the carrier and to move the reproducer mechanism relatively to the record, and mechanism controlled by the position of the carrier to intermittently move the record support.

4. A device of the character described, comprising a movable record support, a record carrier rotatable about and movable along a longitudinal vertical axis, means for rotating the carrier, means for causing the longitudinal movement of the carrier by virtue of its own rotation, a feed screw arranged parallel to the carrier and rotatively connected therewith, a feed member engageable with the screw threads of the feed screw and with the carrier to be moved downwardly by the rotation of the feed screw, a movable reproducer mechanism into proximity with which a record is moved by the vertical movement of the carrier, mechanism controlled by the position of the feed member and adapted to disengage the feed member with the feed screw and the carrier and adapted to move the reproducer to disengage the record on the carrier, means for moving the feed member upwardly when disengaged from the feed screw and the carrier, and mechanism controlled by the position of the carrier and adapted to intermittently move the movable record support.

5. A device of the character described, comprising a record support, a record carrier rotatable about and movable along a longitudinal axis, means for rotating the carrier, means for causing the longitudinal movement of the carrier by virtue of its own rotation, a feed screw arranged parallel to the carrier, a feed member engageable with the screw threads of the feed screw and with the carrier to be moved longitudinally, mechanism for disengaging the feed member controlled by the longitudinal position of said member, mechanism for controlling the means for causing a longitudinal movement of the carrier and controlled by the longitudinal position of the carrier, and mechanism controlled by the rotation of the carrier for controlling the movement of the carrier to one of its extreme positions.

6. A device of the character described, comprising a record support, a record carrier rotatable about and movable along a longitudinal vertical axis, means for rotating the carrier, a vertical feed screw arranged parallel to the carrier, a feed member engageable with the screw threads of the feed screw and with the carrier to be moved downwardly by the rotation of the feed screw, mechanism for disengaging the feed member and controlled by the longitudinal position of said member, means for moving the feed member upwardly when disengaged from the feed screw, and mechanism controlled by the rotation of the carrier for controlling the downward movement of the carrier to its lowermost position.

7. A device of the character described, comprising a movable record support, a record carrier rotatable about and movable along a longitudinal vertical axis, means for rotating the carrier, means for causing the longitudinal movement of the carrier by virtue of its own rotation, a vertical feed screw arranged parallel to the carrier and rotatively connected therewith, a feed member engageable with the screw threads of the feed screw and with the carrier to be moved downwardly by the rotation of the feed screw, mechanism for disengaging the feed member from the feed screw and the carrier and controlled by the longitudinal position of the feed member, means for moving the feed member upwardly when disengaged from the feed screw and carrier, mechanism controlled by the position of the carrier for intermittently operating the movable record support, and mechanism controlled by the rotation of the carrier for controlling the downward movement of the carrier to its lowermost position.

8. A device of the character described, comprising a record support, a record carrier rotatable about and movable along a longitudinal vertical axis, means for rotating the carrier, means for causing the longitudinal upward movement of the carrier by virtue of its own rotation, a reproducer mechanism into proximity with which the record of the carrier is moved by the longitudinal movement of the carrier, a vertical feed screw arranged parallel to the carrier and rotatively connected therewith, a feed member engageable with the screw threads of the feed screw with the carrier to be moved downwardly by the rotation of the carrier, a mechanism controlled by the position of the feed member and adapted to disengage the feed member from the feed screw and the carrier and to move the reproducer mechanism relatively to the record on the carrier, means to move the feed member upwardly when disengaged from the feed screw and the carrier, and mechanism controlled by the rotation of the carrier, for controlling the downward movement of the carrier to its lowermost position.

9. A device of the character described, comprising a movable record support, a record carrier rotatable about and movable along a longitudinal vertical axis, means for rotating the carrier, means for causing the longitudinal movement of the carrier by virtue of its own rotation, a feed screw arranged parallel to the carrier and rotatively connected therewith, a feed member engageable with the screw threads of the feed screw and with the carrier to be moved downwardly by the rotation of the feed screw, a movable reproducer mechanism into proximity with which a record is moved by the vertical movement of the carrier, mechanism controlled by the position of the feed member and adapted to disengage the feed member from the feed screw and the carrier and adapted to move the reproducer to disengage the record on the carrier, means for moving the feed member upwardly when disengaged from the feed screw and the carrier, mechanism controlled by the position of the carrier and adapted to intermittently move the movable record support, and mechanism controlled by the rotation of the carrier for controlling the downward movement of the carrier to its lowermost position.

10. In a device of the character described, a record carrier rotatable about and movable along a longitudinal axis, an electric motor rotatively connected to the carrier, means for causing the longitudinal movement of the carrier, and switch control means for the motor comprising a manually operable switch and a switch controlled by the position of the carrier, the switches being in parallel with each other and in series with the motor.

11. In a device of the character described, a record support, a record carrier rotatable about and movable along a longitudinal axis to engage a record on the support, an electric motor rotatively connected to the carrier, means for causing the longitudinal movement of the carrier, and switch control means for the motor comprising a manually operable switch and a switch controlled by the position of the carrier, the switches being in parallel with each other and in series with the motor.

12. In a device of the character described, a record carrier rotatable about and movable along a longitudinal vertical axis, an electric motor rotatively connected to the carrier, means for causing the longitudinal movement of the carrier, and switch control means for the motor, comprising a manually operable switch and a switch controlled by the position of the carrier, the switches being in parallel with each other and in series with the motor, and the carrier controlled switch being normally closed and adapted to be opened by the carrier when at its lowermost position.

13. In a device of the character described, a record support, a record carrier rotatable about and movable along a longitudinal axis to engage and remove a record from the support, an electric motor rotatively connected to the carrier, means for causing the longitudinal movement of the carrier, and switch control means for the motor comprising a switch controlled by the position of the carrier, the switch being normally closed and adapted to be opened by the carrier when in position to not engage a record.

14. A device of the character described, comprising a record support, a record carrier rotatable about and movable along a longitudinal vertical axis, means for rotating the carrier, a vertical feed screw arranged parallel to the carrier, a feed member engageable with the screw threads of the feed screw and with the carrier to be moved downwardly by the rotation of the feed screw, mechanism for disengaging the feed member from the feed screw and carrier and controlled by the longitudinal position of said member, means for moving the feed member upwardly when disengaged from the feed screw, an electric motor rotatively connected to the carrier, and switch control means for the motor comprising a manually operable switch and a switch controlled by the carrier, the switches being in parallel with each other and in series with the motor, the carrier controlled switch being normally closed and being adapted to be opened by the carrier when in its lowermost position.

15. A device of the character described, comprising a record support, a record reproducer mechanism, a record carrier rotatable about and movable along a longitudinal axis, means for rotating the carrier, means for causing the movement of the carrier longitudinally to engage a record on the support and move it into proximity to the reproducer mechanism, means controlled by the position of the carrier to move the reproducer into engagement with the record carried by the carrier, and manually operable means for moving the reproducer.

16. A device of the character described, comprising a record support, a record carrier rotatable about and movable along a longitudinal axis, means for rotating the carrier, means for causing the longitudinal movement of the carrier by virtue of its own rotation, a feed screw arranged parallel to the carrier, a feed member engageable with the screw threads of the feed screw and with the carrier to be moved longitudinally, mechanism for disengaging the feed member from the feed screw and carrier and controlled by the longitudinal position of said member, and mechanism for controlling the means for causing a longitudinal movement of the carrier and controlled by the longitudinal position of the carrier, and manually operable means for controlling the mechanism normally controlled by the position of the feed member.

17. A device of the character described, comprising a record support, a record carrier rotatable about and movable along a longitudinal axis, means for rotating the carrier, means for causing the longitudinal movement of the carrier by virtue of its own rotation, a movable reproducer mechanism into proximity with which a record is moved by the longitudinal movement of the record carrier, a feed screw arranged parallel to the carrier and rotatively connected therewith, a feed member engageable with the screw threads of the feed screw and with the carrier to be moved longitudinally by the rotation of the feed screw, a mechanism controlled by the longitudinal position of the feed member and adapted to both disengage the feed member from the feed screw and the carrier and to move the reproducer mechanism out of engagement with a record carried by the carrier, and manually operable means for controlling the mechanism normally controlled by the position of the feed member.

18. A device of the character described, comprising a movable record support, a record carrier rotatable about and movable along a longitudinal axis, means for rotating the carrier, means for causing the longitudinal movement of the carrier by virtue of its own rotation, a feed screw arranged parallel to the carrier and rotatively connected therewith, a feed member engageable with the screw threads of the feed screw and with the carrier to be moved longitudinally by the rotation of the feed screw, mechanism for disengaging the feed member controlled by the longitudinal position of said member, mechanism controlled by the position of the carrier to operate the movable record support, manually operable means for controlling the operation of the mechanism normally controlled by the position of the feed member, and manually operable means for controlling the operation of the mechanism normally controlled by the position of the carrier.

19. A device of the character described, comprising a movable record support, a record carrier rotatable about and movable along a longitudinal vertical axis, means normally controlled by the longitudinal position of the carrier to cause the movement of the record support, means for rotating the carrier, means for causing the longitudinal movement of the carrier by virtue of its own rotation, a vertical feed screw arranged parallel to the carrier, a feed member engageable with the screw threads of the feed screw and with the carrier to be moved downwardly by the rotation of the feed screw, mechanism for disengaging the feed member and controlled by the longitudinal position of said member, means for moving the feed member upwardly when disengaged from the feed screw, manually operable means for controlling the operation of the mechanism normally controlled by the position of the feed member, and manually operable means for controlling the operation of the mechanism normally controlled by the position of the carrier.

20. A device of the character described, comprising a movable record support, a record carrier rotatable about and movable along a longitudinal vertical axis, means for rotating the carrier, means for causing the longitudinal movement of the carrier by virtue of its own rotation, a vertical feed screw arranged parallel to the carrier and rotatively connected therewith, a feed member engageable with the screw threads of the feed screw and with the carrier to be moved downwardly by the rotation of the feed screw, mechanism for disengaging the feed member from the feed screw and the carrier and controlled by the longitudinal position of the feed member, means for moving the feed member upwardly when disengaged from the feed screw and carrier, mechanism controlled by the position of the carrier for intermittently operating the movable record support, manually operable means for controlling the operation of the mechanism controlled by the position of the feed member, and manually operable means for controlling the operation of the mechanism normally controlled by the position of the carrier.

21. In a device of the character described, a record carrier adapted to rotate about and move along a longitudinal axis, means for rotating the carrier, a feed screw arranged parallel to and adjacent the carrier, a feed member engageable with the screw threads of the feed screw and with the carrier to be moved longitudinally by the rotation of the feed screw, a rotatable cam, mechanism controlled by the longitudinal position of the feed member to rotatively connect the cam to the feed screw, and means operated by the cam in rotation to disconnect the feed member from the feed screw and the carrier.

22. A device of the character described, comprising a movable record support, a record carrier adapted to rotate about and move along a longitudinal axis, means for rotating the carrier, a feed screw arranged parallel and adjacent to the record carrier and rotatively connected therewith, a feed member engageable with the feed screw and with the carrier and adapted to be moved longitudinally by the rotation of the feed screw, a rotatable cam, mechanism controlled by the longitudinal position of the feed member to rotatively connect the cam to the feed screw, means operated by the cam in rotation to disconnect the feed member from the feed screw and the carrier, and mechanism controlled by the position of the carrier to intermittently operate the movable record support.

23. A device of the character described, comprising a movable record support, a record reproducing mechanism arranged adjacent the support, a record carrier adapted to rotate about and move along a longitudinal axis, means for rotating the carrier, means for causing the longitudinal movement of the carrier by virtue of its own rotation to engage and carry a record into proximity with the reproducing mechanism, a feed screw arranged parallel to the carrier and rotatively connected therewith, a feed member engageable with the screw threads of the feed screw and with the carrier and adapted to move longitudinally by the rotation of the feed screw, a rotatable cam, mechanism controlled by the longitudinal position of the feed member to rotatively connect the cam to the feed screw, means operated by the cam in rotation to disconnect the feed member from the feed screw and the carrier and to move the reproducing mechanism out of engagement with a record upon the carrier, and mechanism controlled by the position of the carrier to intermittently operate the movable record support.

24. A device of the character described, comprising a movable record support, a record reproducing mechanism arranged adjacent the support, a record carrier adapted to rotate about and move along a longitudinal axis, means for rotating the carrier, means for causing the longitudinal movement of the carrier by virtue of its own rotation to engage and carry a record into proximity with the reproducing mechanism, a feed screw arranged parallel to the carrier and rotatively connected therewith, a feed member engageable with the screw threads of the feed screw and with the carrier and adapted to be moved longitudinally by the rotation of the feed screw, a rotatable cam, mechanism controlled by the longitudinal position of the feed member to rotatively connect the cam to the feed screw, means operated by the cam in rotation to first move the reproducing mechanism out of engagement with the record on the carrier and then to disconnect the feed member from the feed screw and the carrier, and mechanism controlled by the position of the carrier to intermittently operate the movable record support.

25. A device of the character described, comprising a record carrier adapted to rotate about and move along a longitudinal axis, means for rotating the carrier, a feed screw arranged adjacent and parallel to the carrier and rotatively connected therewith, a feed member disengageably engaging the carrier and feed screw, means for moving the feed member back to its initial position when disengaged from the feed screw and the carrier, a reproducing mechanism, means controlled by the position of the feed member to move the reproducing mechanism in one direction, and means controlled by the position of the feed member to prevent the movement of the reproducing mechanism in the other direction.

26. A device of the character described, comprising a movable record support, a record carrier, means to move the record carrier to engage and remove a record from the support, a member slidable along and rotatable about an axis, a ratchet mechanism for moving the record support, means on the slidable and rotatable member for engaging with the ratchet mechanism, means for rotating said member, and means operated by the moving carrier to move the slidable and rotatable member.

27. A device of the character described, comprising a movable record support, a record carrier, means to move the record carrier to engage and remove a record from the support, a slidable shaft, a member rotatively mounted on the shaft, a ratchet mechanism for moving the record support and having a projecting arm, means for rotating said member on the slidable shaft, and means for sliding said shaft by virtue of the carrier motion thereby causing said member on the slidable shaft to be engageable with the ratchet arm.

28. A device of the character described, comprising a record support, a record carrier rotatable about and movable along a longitudinal axis, means for rotating the carrier, means for causing the movement of the carrier longitudinally to remove a record from the support, another means for causing another longitudinal movement of the carrier, mechanisms controlled by the position of the carrier to control the longitudinal movement causing means, and manually operable means for controlling one of the longitudinal movement causing means.

29. A device of the character described, comprising a movable record support, a record carrier, means to move the record carrier to engage a record and remove it from the support, mechanism controlled by the movement of the carrier to move the record support, and manually operable means for controlling the mechanism for moving the record support.

30. A device of the character described, comprising a horizontal revoluble table mounted on a vertical axis, said table having a plurality of record holding pockets near its periphery and adapted to hold cylindrical records in vertical positions, a vertically movable and revoluble mandrel shaft adapted to pass up through the pockets in the record carrying table, a record engaging mandrel mounted on the upper end of the shaft, a reproducing mechanism mounted above the record carrying table, means to rotate the mandrel shaft, means to cause the elevation of the mandrel shaft to raise the mandrel to a point adjacent the reproducing mechanism, and means for feeding the mandrel shaft and mandrel downwardly to feed the record past the reproducing mechanism.

31. A device of the class described, comprising a vertically journaled shaft, a circular record supporting table mounted on the upper end of the shaft, said table having a plurality of record holding pockets near its periphery, a vertical mandrel shaft mounted in bearings to revolve and slide vertically, a record engaging mandrel on the upper end of the shaft, the mandrel adapted to pass through the pockets in the record supporting table and engage with the records therein, means to revolve the mandrel shaft, a screw thread mechanism whereby the revolution of the mandrel shaft serves to raise itself, means for feeding the mandrel shaft and mandrel downwardly from their uppermost position, means for intermittently rotating the record carrying table, said means including an actuating mechanism and a controlling mechanism adapted to be operated by the mandrel shaft when at its lowermost point of travel.

32. A device of the character described, comprising a horizontal record supporting member, said member having pockets therein for carrying cylindrical records with their axes vertical, a record carrying member adapted to move along and rotate around a vertical axis, mechanism for causing the rotation of the record carrying member and causing its vertical movement, mechanism for intermittently moving the record supporting member, and mechanism controlled by the position of the record carrying member to control the intermittently operating mechanism and the mechanism which causes the vertical movement of the record carrying member.

33. A device of the class described, comprising a horizontally movable record supporting table, a record carrying member arranged to move along and rotate around a vertical axis, a screw thread arranged around the vertical axis of the record carrying member, a stop arranged to move to and from the axis into and out of the screw thread, means for normally pressing the stop into the screw thread, a detent for holding the stop out of the screw thread, means for intermittently actuating the record supporting table, means connected with said actuating means to engage with the detent and withdraw it from engagement with the stop, and controlling means for the said intermittently actuating means, said controlling means adapted to be actuated by the record carrying member when at its lowermost point.

34. A device of the character described, comprising a movable record support, a record carrier adapted to move along and rotate around a longitudinal axis, mechanism for causing the rotation and longitudinal movement of the record carrier to pick up a record and carry it longitudinally from the record support, mechanism for intermittently moving the record support, and mechanism controlled by the position of the record carrier to control the intermittently operating mechanism and the mechanism which causes the longitudinal movement of the record carrier.

35. A device of the character described, comprising a movable record support, a record carrier adapted to move along and rotate around a longitudinal axis, means for rotating said carrier, mechanism for causing the longitudinal movement of the carrier by virtue of its own rotation, mechanism for intermittently moving the record support, and mechanism controlled by the position of the record carrier to control the intermittently operating mechanism and the mechanism which causes the longitudinal movement of the record carrier.

36. A device of the character described, comprising a support adapted for supporting a plurality of records, a record carrier adapted to move along and to rotate around a longitudinal axis, the longitudinal movement of the carrier engaging and removing longitudinally a record from the support, means to rotate and to move the carrier longitudinally, and mechanism controlled by the position of the carrier to control means for moving the carrier longitudinally.

37. A device of the character described, comprising a support adapted for supporting a plurality of records, a record carrier adapted to move along and to rotate about a longitudinal axis, the longitudinal movement of the carrier engaging and removing longitudinally a record from the support, means to rotate the carrier, mechanism to cause the longitudinal movement of the carrier by virtue of its own rotation, and means controlled by the position of the carrier to control the longitudinal movement mechanism.

38. A device of the character described, comprising a record support, a record carrier adapted to move along and rotate about a longitudinal axis, means to rotate the carrier, means to cause a longitudinal movement thereof to remove a record from the support, another means to cause another longitudinal movement of the carrier, and mechanisms controlled by the position of the carrier to control the operation of the means causing the longitudinal movements of the carrier.

39. A device of the character described, comprising a record support, a record carrier adapted to move along and rotate about a longitudinal axis, means to rotate the carrier, means to cause a longitudinal movement of the carrier, another means to cause another longitudinal movement of the carrier by virtue of its own rotation, mechanism controlled by the position of the carrier to control the operation of the first mentioned carrier longitudinal moving means, and mechanism controlled by the position of the carrier to control the operation of the mechanism causing the longitudinal movement of the carrier by virtue of its own rotation.

40. A device of the character described, comprising a record support, a record carrier adapted to move along and to rotate about a longitudinal axis, means to rotate the carrier, means to cause a longitudinal movement of the carrier to remove a record from the support, another means to cause another longitudinal movement of the carrier, means for intermittently moving the record support, and mechanisms controlled by the position of the carrier to control the operation of the record support moving mechanism and to control the operation of the means causing the longitudinal movements of the carrier.

41. A device of the character described, comprising a record support, a record carrier adapted to move along and to rotate about a longitudinal axis, means to rotate the carrier, a mechanism to cause the longitudinal movement of the carrier by virtue of its own rotation, another mechanism for causing the longitudinal movement of the carrier by virtue of its own rotation but in a ratio differing from that caused by the first mentioned mechanism, and means controlled by the position of the carrier to control the longitudinal movement mechanisms.

42. A device of the character described, comprising a record support, a record carrier adapted to move along and to rotate about a longitudinal axis, means to rotate the carrier, mechanism to cause the longitudinal movement of the carrier by virtue of its own rotation, another mechanism to cause the longitudinal movement of the carrier by virtue of its own rotation but in a ratio different and in a direction opposite that caused by the first mentioned mechanism, and means controlled by the position of the carrier to control the longitudinal movement mechanisms.

43. A device of the character described, comprising a record support, a record engaging mandrel, a mandrel shaft carrying said mandrel and adapted to move along and to rotate about a longitudinal axis, means to rotate the mandrel shaft, screw mechanism to cause the longitudinal movement of the mandrel shaft by virtue of its own rotation, another screw mechanism to cause the longitudinal movement of the mandrel shaft by virtue of its own rotation but in a ratio different from that caused by the first mentioned mechanism, and means controlled by the position of the mandrel shaft to control the longitudinal movement mechanisms.

44. A device of the character described, comprising a record support, a record engaging mandrel, a mandrel shaft carrying said mandrel and adapted to move along and to rotate about a longitudinal axis, means to rotate the mandrel shaft, screw mechanism to cause the longitudinal movement of the mandrel shaft by virtue of its own rotation, a feed screw arranged parallel to the mandrel shaft, means for connecting said feed screw with the mandrel shaft, and means controlled by the position of the mandrel shaft to control the longitudinal movement mechanism and to control the connection of the feed screw with the mandrel shaft.

45. A device of the character described, comprising a record support, a record engaging mandrel, a mandrel shaft carrying said mandrel and having screw threads cut in its exterior surface, a feed screw arranged parallel with the mandrel shaft, means for connecting the feed screw with the mandrel shaft, a member adapted to coöperate with the screw threads in the mandrel shaft to cause its longitudinal movement when rotated, mechanisms controlled by the position of the mandrel shaft to control the coöperation of said member with said screw threads and to control the connection of the feed screw with the mandrel shaft, and means to rotate the mandrel shaft and the feed screw.

46. A device of the character described, comprising a record support, a record engaging mandrel, a mandrel shaft carrying said mandrel and having a screw thread thereon, a stop adapted to engage and disengage with said screw thread and immovable in a direction parallel to the mandrel shaft, thereby to cause the longitudinal movement of the mandrel when rotated, means for moving the stop into and out of the screw thread, a feed screw arranged parallel to the mandrel shaft, connecting means between the feed screw and the mandrel shaft, said connecting means comprising a slidable member having means for engagement with the mandrel shaft and having means for engagement with the feed screw, means controlled by the position of the mandrel shaft to control the operation of the stop movement means and to control the operation of the means to connect the mandrel shaft with the feed screw, and means to rotate the mandrel shaft and the feed screw.

47. A device of the character described, comprising a record support, a record carrier adapted to move along and rotate about a longitudinal axis, means to rotate the carrier, means to cause a longitudinal movement of the carrier to remove a record from the support, a reproducing mechanism into proximity with which the record is moved, means to cause another longitudinal movement of the carrier by virtue of its rotation to engage the record with the reproducing mechanism, mechanisms controlled by the position of the carrier to control the operations of the means causing the longitudinal movements of the carrier, and mechanism to move the reproducing mechanism into and out of engagement with a record on the carrier.

48. A device of the character described, comprising a record support, a record carrier adapted for movement along and rotation about a vertical axis, means for rotating the carrier, means for causing the record carrier to move upwardly to engage a record and move it from the record support, means for causing the carrier to move downwardly by virtue of its own rotation, and mechanisms controlled by the position of the carrier to control the means for causing the carrier movements.

49. In a device of the character described, a record carrier adapted for rotation about and movement along a vertical axis, a vertical feed screw adjacent the carrier and rotatively connected therewith, means engageable with the threads of the feed screw and engageable with the carrier whereby the carrier and engaging means are moved downwardly, means for moving the engaging means upwardly, and mechanism controlled by the position of the engaging means to disengage the engaging means from the feed screw and carrier.

50. In a device of the character described, a record carrier adapted for rotation about and movement along a vertical axis, means for moving the carrier upwardly, a vertical feed screw adjacent the carrier and rotatively connected therewith, means engageable with the threads of the feed screw and engageable with the carrier whereby the carrier and engaging means are moved downwardly, means for moving the engaging means upwardly, and mechanism controlled by the position of the engaging means to disengage the engaging means from the feed screw and carrier.

51. In a device of the character described, a record carrier adapted for rotation about and movement along a vertical axis, means for causing the upward movement of the carrier by virtue of its own rotation, a vertical feed screw adjacent the carrier and rotatively connected therewith, means engageable with the threads of the feed screw and engageable with the carrier whereby the carrier and engaging means are moved downwardly, means for moving the engaging means upwardly, and mechanism controlled by the position of the engaging means to disengage the engaging means from the feed screw and carrier.

52. In a device of the character described, a record carrier adapted for rotation about and movement along a vertical axis, means for causing the upward movement of the carrier by virtue of its own rotation, a vertical feed screw adjacent the carrier and rotatively connected therewith, means engageable with the threads of the feed screw and engageable with the carrier whereby the carrier and engaging means are moved downwardly, means for moving the engaging means upwardly, mechanism controlled by the position of the carrier to control the operation of the means for causing the upward movement of the carrier, and mechanism controlled by the position of the engaging means to disengage the engaging means from the feed screw and carrier.

53. A device of the character described, comprising a record support, a record reproducing mechanism, a record carrier rotatable about and movable along a longitudinal axis, means for rotating the carrier, means for causing the movement of the carrier longitudinally to engage a record on the support and move it longitudinally into proximity with the reproducing mechanism, and means coöperating with the carrier to move the reproducing mechanism relatively to the record on the carrier.

54. A device of the character described, comprising a record support, a record carrier rotatable about and movable along a longitudinal axis, means for rotating the carrier, means for causing the longitudinal movement of the carrier by virtue of its own rotation, a feed screw arranged parallel to the carrier, a feed member engageable with the screw threads of the feed screw and with the carrier to be moved longitudinally, mechanism for disengaging the feed member and controlled by the longitudinal position of said member, and mechanism for controlling the means for causing a longitudinal movement of the carrier and controlled by the longitudinal position of the carrier.

55. A device of the character described, comprising a record support, a record carrier rotatable about and movable along a longitudinal vertical axis, means for rotating the carrier, a vertical feed screw arranged parallel to the carrier, a feed member engageable with the screw threads of the feed screw and with the carrier to be moved downwardly by the rotation of the feed screw, mechanism for disengaging the feed member and controlled by the longitudinal position of said member, and means for moving the feed member upwardly when disengaged from the feed screw.

56. A device of the character described, comprising a movable record support, a record carrier rotatable about and movable along a longitudinal axis, means for rotating the carrier, means for causing the longitudinal movement of the carrier by virtue of its own rotation, a feed screw arranged parallel to the carrier and rotatively connected therewith, a feed member, engageable with the screw threads of the feed screw and with the carrier to be moved longitudinally by the rotation of the feed screw, mechanism for disengaging the feed member controlled by the longitudinal position of said member, and mechanism controlled by the position of the carrier to operate the movable record support.

57. A device of the character described, comprising a movable record support, a record carrier rotatable about and movable along a longitudinal vertical axis, means for rotating the carrier, means for causing the longitudinal movement of the carrier by virtue of its own rotation, a vertical feed screw arranged parallel to the carrier and rotatively connected therewith, a feed member engageable with the screw threads of the feed screw and with the carrier to be moved downwardly by the rotation of the feed screw, mechanism for disengaging the feed member from the feed screw and the carrier and controlled by the longitudinal position of the feed member, means for moving the feed member upwardly when disengaged from the feed screw and carrier, and mechanism controlled by the position of the carrier for intermittently operating the movable record support.

58. In a device of the character described, a record carrier adapted for rotation about and movement along a longitudinal axis, a feed screw arranged parallel to the carrier, means to rotate the feed screw and carrier, a feed member engageable with the feed screw and adapted to be moved longitudinally by the rotation thereof, means for moving the feed member in the direction opposite to that of its screw fed movement, means on the carrier engageable by the feed member whereby the carrier is moved with the feed member during its screw fed movement, means controlled by the position of the carrier and feed member for disengaging the feed member from the carrier, and means for causing the movement of the carrier in the direction opposite to its screw fed movement.

59. A device of the character described, comprising a horizontal record supporting table, a vertical shaft about which the table is adapted to rotate, means for supporting records at points around the periphery of the table, means for engaging the records on the table and removing them therefrom, and means controlled by said last mentioned means for intermittently rotating said table.

60. A device of the character described, comprising a horizontal table having apertures in its upper surface for the reception of records, a vertically movable record carrier adapted to engage the records and move them from the table, means to move the record carrier, and means controlled by the movement of the record carrier to intermittently rotate the table.

61. In a device of the character described, a record supporting table comprising a vertical shaft, and a horizontal table member mounted on the shaft to rotate about its vertical axis, the table having a series of vertical openings therethrough near its outer periphery and each opening having an annular shelf upon which a record may rest.

62. In a device of the character described, a horizontal record supporting table adapted to rotate about a vertical axis, the table having a plurality of apertures extending vertically therethrough near its outer periphery, each of the apertures having an annular shelf upon which a record is adapted to rest, a record carrier located beneath the table and adapted to move upwardly through one of the apertures in the table and to engage a record and remove it from the table, means to move the record carrier in a vertical direction, and mechanism controlled by the movement of the record carrier to intermittently rotate the table.

63. A device of the character described, comprising a record support, a record reproducing mechanism, a record carrier adapted to move along and to rotate around a longitudinal axis, the longitudinal movement of the carrier engaging and removing longitudinally a record from the support, means to rotate and to move the carrier longitudinally, mechanism controlled by the position of the carrier to control the means for moving the carrier longitudinally, and means coöperating with the carrier to cause the movement of the reproducing mechanism relatively to a record on the carrier.

64. A device of the class described, comprising a record support, a record reproducing mechanism, a record carrier adapted to move along and to rotate about a longitudinal axis, the longitudinal movement of the carrier engaging and removing longitudinally a record from the support and moving the record into proximity with the reproducing mechanism, means to rotate the carrier, mechanism to cause the longitudinal movement of the carrier by virtue of its own rotation, means controlled by the position of the carrier to control the longitudinal movement causing mechanism, and means coöperating with the carrier to cause the movement of the reproducing mechanism relatively to the record on the carrier.

In witness that we claim the foregoing we have hereunto subscribed our names this 18th day of May, 1911.

HARRY T. SCOTT.
LEO J. PATTERSON.

Witnesses:
JAMES T. BARKELEW,
ELWOOD H. BARKELEW.